UNITED STATES PATENT OFFICE.

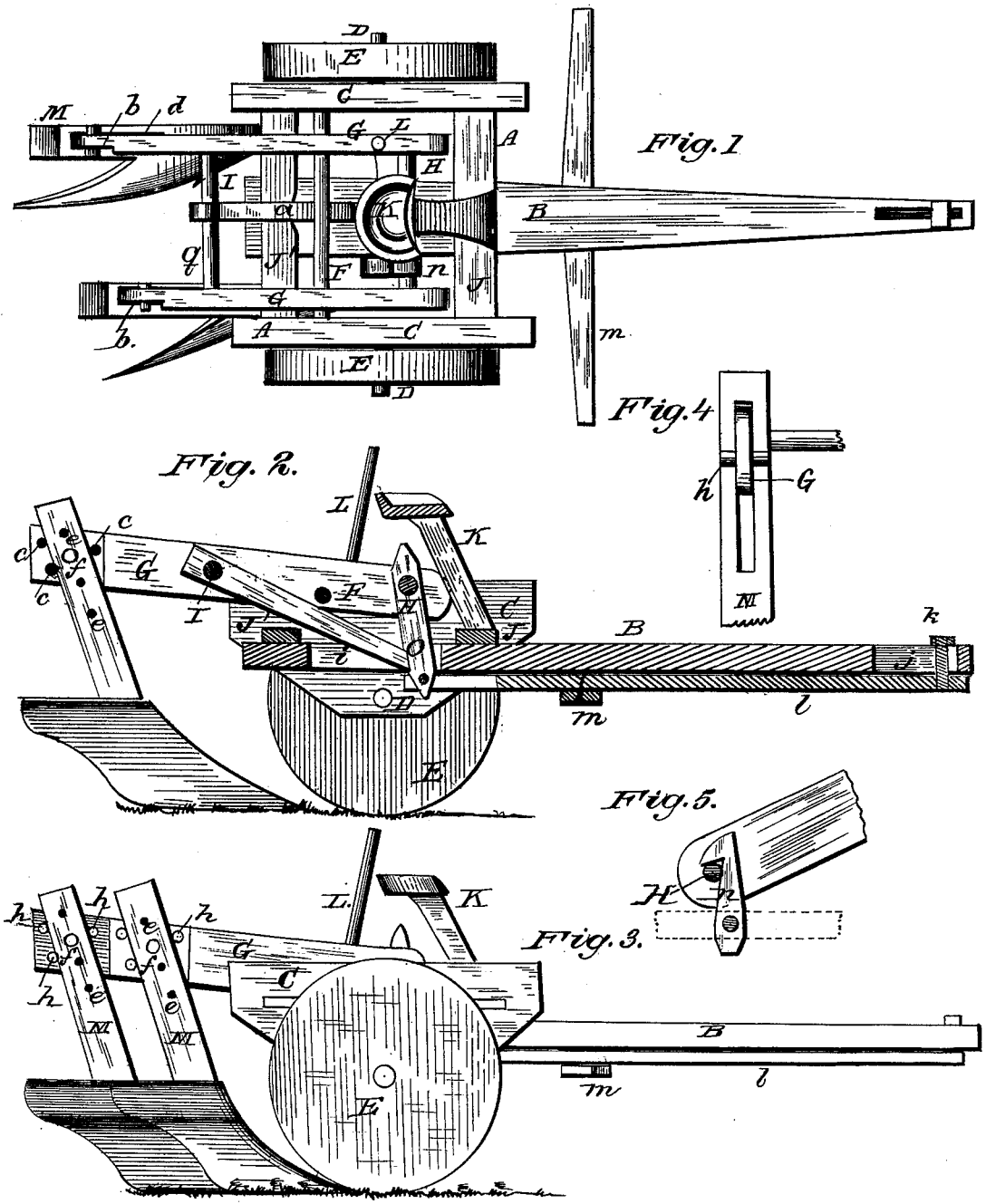

MILO A. ELLIOTT, OF STRATFORD HOLLOW, NEW HAMPSHIRE.

PLOW.

SPECIFICATION forming part of Letters Patent No. 231,218, dated August 17, 1880.

Application filed March 17, 1880. (No model.)

*To all whom it may concern:*

Be it known that I, MILO A. ELLIOTT, of Stratford Hollow, in the county of Coos and State of New Hampshire, have invented certain new and useful Improvements in Plows; and I do hereby declare that the following is a full, clear, and exact description of the invention, which will enable others skilled in the art to which it appertains to make and use the same, reference being had to the accompanying drawings, which form a part of this specification.

This invention relates to wheel-plows; and it consists in the improvements in the construction of the same hereinafter fully described, and particularly pointed out in the claims.

In the drawings, Figure 1 is a plan view. Fig. 2 is a vertical longitudinal sectional view. Fig. 3 is a side elevation, and Figs. 4 and 5 are detail views.

Referring by letter to the drawings, A designates the frame, which is fixed to the pole B, as shown.

The sides C C of the frame A have spindles D, upon which the supporting-wheels E E are journaled. A shaft or rod, F, is journaled in the sides C C of the frame A, and to this shaft F the plow-beams G are fixed forward of their centers. A V-shaped arm, O, is also connected to the plow-beams G by rods H I. The sides C C are connected by cross-bars J J', the latter of which is notched at its center, and in it one arm, a, of the V-shaped arm rests when the plows are depressed. The forward cross-bar, J, carries the driver's seat K.

The left-hand plow-beam G is provided with a lever, L, forward of the shaft or rod F, for elevating the plows at pleasure. The rear ends of the plow-beams G are tenoned at b, and provided with perforations c and pins to bind the slotted plow-standards in place.

The plow-standards M are slotted at d, as shown, and are perforated at e to receive a bolt, f, for adjusting the plows to the proper depth. The standards M are bound in place by bolts h, which, when inserted, bear against the front and rear faces of the same.

The pole B is slotted near its rear end at i, and through this slot a portion of the V-shaped arm O depends. The forward end of the pole B is also slotted, and in this slot j works a bolt, k, screwed into the forward end of an auxiliary tongue, l, the rear end of which is bifurcated and pivoted to the lower portion of the V-shaped arm O. To the under side of the auxiliary tongue l is pivoted the double-tree m, to which the horses are attached.

A hook, n, is pivoted to one side of the pole B, near its rear end, and engages with the shaft H, which connects the plow-beams G at their front ends. This shaft H passes through the front arm of the V-shaped arm O, and a similar rod or shaft, I, passes through the rear arm of the same and connects the plow-beams near their rear ends.

The operation of the plow is certain and simple. The team when drawing upon the double-tree operates the auxiliary tongue, the rear end of which is connected to the V-shaped arm or lever O, and depresses the plows and holds them in place in the ground. When the horses are backed the neck-yoke drives the bolt k back in its slot and elevates the plows, so that the hook engages with the shaft H and keeps them elevated until designedly released. The plows can therefore be transported from place to place without permitting them to enter the ground.

The slotted standards M can, by means of the perforations e, be adjusted to different depths by removing and replacing the bolts f in the desired perforations.

The hand-lever L can be employed to elevate the plows without backing or stopping the team.

The bolts passed through the perforated and tenoned ends of the beams bear against the faces of the plow-standards and take the strain from the locking-bolts.

Having thus fully described my invention, what I claim as new and useful, and desire to secure by Letters Patent, is—

1. In a plow, the combination, with the V-shaped arm O, connected to the plow-beams by rods H I, of the pole B and the auxiliary tongue l, carrying the double-tree m, and the pivoted hook n, substantially as and for the purposes set forth.

2. In a plow, the combination of the plow-beams G, pivoted, as shown, with the pivoted hook n, shaft H, lever L, and pole and tongue B l, substantially as and for the purposes set forth.

In testimony that I claim the foregoing as my own I have hereto affixed my signature in presence of two witnesses.

MILO A. ELLIOTT.

Witnesses:
P. G. STONE,
F. N. DAY,
WARREN LATHE.